United States Patent [19]

Eck

[11] 4,255,112

[45] Mar. 10, 1981

[54] CHEMICAL APPLICATOR APPARATUS FOR MATERIAL TREATMENT

[76] Inventor: Joel D. Eck, Rte. 2, Box 82, Valley Center, Kans. 67417

[21] Appl. No.: 70,888

[22] Filed: Aug. 29, 1979

[51] Int. Cl.³ .............................................. B28B 5/02
[52] U.S. Cl. .................................. 425/209; 425/220; 425/434; 425/435
[58] Field of Search ................ 425/209, 220, 434, 435

[56] References Cited

U.S. PATENT DOCUMENTS

| | | | |
|---|---|---|---|
| 1,891,790 | 12/1932 | Wilderman | 425/209 |
| 2,154,708 | 4/1939 | Spiselman | 425/209 |

*Primary Examiner*—Donald E. Czaja
*Assistant Examiner*—James R. Hall
*Attorney, Agent, or Firm*—Phillip A. Rein

[57] ABSTRACT

This invention is a chemical applicator apparatus normally secured to an auger conveyor to discharge a controlled amount of chemical or other substance to the material being conveyed into a storage bin to prevent insect damage. The chemical applicator apparatus includes (1) a main housing means to hold the chemical or other substance therein; (2) a main drive means secured to the main housing means; and (3) an actuator and discharge means connected to and operated by the main drive means. The actuator and discharge means includes (1) an actuator assembly to agitate and compact a portion of the chemical or other substance contained therein; (2) a sprocket and chain assembly driven by the main drive means adapted to receive and convey the compacted portion of the chemical or other substance to a discharge area for positive injection into the auger or other type conveyor.

10 Claims, 5 Drawing Figures

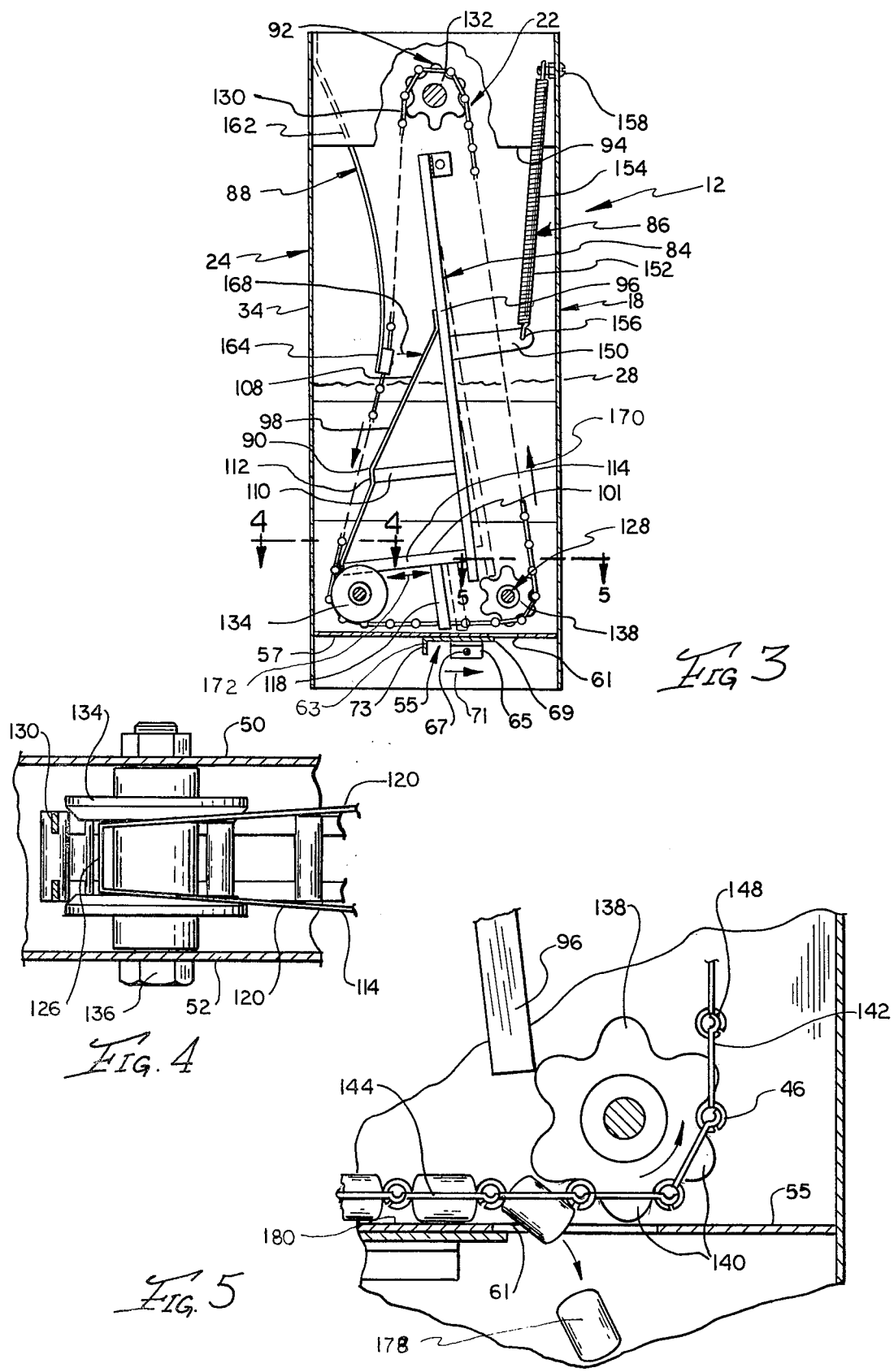

CHEMICAL APPLICATOR APPARATUS FOR MATERIAL TREATMENT

PRIOR ART

No patent search was conducted so no prior art patents are cited herein.

However, applicant knows of no similar device nor any structure operable to discharge a flour-like chemical or other substance accurately into an auger conveyor for the prevention of insect damage.

PREFERRED EMBODIMENT OF THE INVENTION

The chemical applicator apparatus is used to inject a controlled amount of chemical or other substance onto kernels of grain being augered into a storage bin to prevent insect damage thereto. The chemical applicator apparatus includes (1) a main housing means to be secured to an auger conveyor; (2) a main drive means operable to rotate a main drive shaft at an adjustable speed; and (3) an actuator and discharge means driven by the main drive shaft being operable to agitate and compact a certain amount of the chemical or other substance and eject the chemical or other substance into the auger conveyor. The invention is in the actuator and discharge means which includes (1) an actuator means pivotally connected to the main housing means; (2) a biasing means connected to the actuator means to control movement thereof in one direction; and (3) a chain tension means engageable with a chain assembly of the actuator means. The actuator means includes (1) an actuator assembly operable to pivotally reciprocate in the main housing means; and (2) a sprocket and chain assembly operably associated with the actuator assembly. The sprocket and chain assembly includes a drag chain mounted on a sprocket assembly for movement thereabout. The drag chain rotates to move the actuator assembly in a direction opposite to movement by the biasing means to (1) agitate the chemical or other substance; (2) compact a measured amount of the chemical or other substance into capsules; and (3) eject the chemical or other capsule into the auger conveyor.

OBJECTS OF THE INVENTION

One object of the chemical applicator apparatus of this invention is to provide an adjustable chemical dispenser which can be mounted on all types and sizes of conveyors.

Another object of the chemical applicator apparatus of this invention is to provide a structure to continuously agitate the chemical or other substance contained therein which is required in numerous flour type, non-flowing, powdered chemicals or substances such as Malathion.

One other object of the chemical applicator apparatus of this invention is to provide means to adjust the speed and thus the output of chemical therefrom.

Still another object of this invention is to provide a chemical applicator apparatus that is sturdy in construction, easy to install on a conveyor structure, variable in dispensing, and reliable in operator.

Various other objects, advantages, and features of the invention will become apparent to those skilled in the art from the following discussion, taken in conjunction with the accompanying drawings, in which:

FIGURES OF THE INVENTION

FIG. 3 is a sectional view taken along line 3—3 in FIG. 2;

FIG. 4 is an enlarged fragmentary section view taken along line 4—4 in FIG. 3; and FIG. 5 is an enlarged fragmentary sectional view taken along line 5—5 in FIG. 5.

Figure 1:
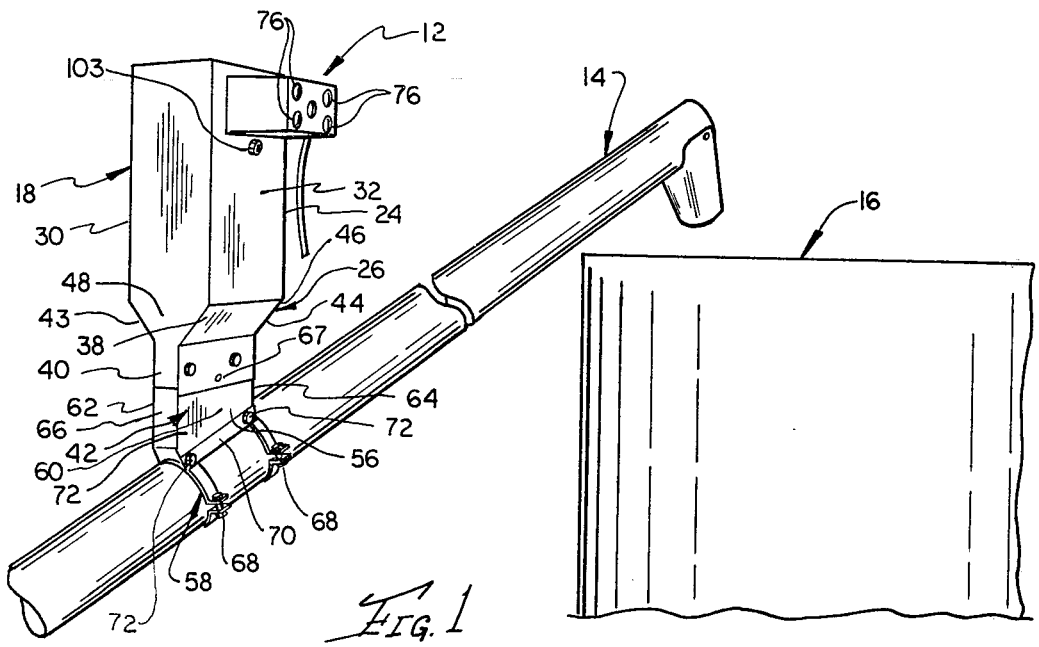
FIG. 1 is a perspective view of the chemical applicator apparatus of this invention shown as mounted on an auger conveyor to dispense a predetermined amount of chemical or other substance into the material being moved by the auger conveyor into a storage bin.

The following is a discussion and description of preferred specific embodiments of the new chemical applicator apparatus of this invention, such being made with reference to the drawings, whereupon the same reference numerals are used to indicate the same or similar parts and/or structure. It is to be understood that such discussion and description is not to unduly limit the scope of the invention.

DESCRIPTION OF THE INVENTION

Referring to FIG. 1, a chemical applicator apparatus of this invention indicated generally at 12 is shown as mounted on an auger conveyor 14 to dispense a chemical or other substance therein as it moves material into a storage bin 16. It has been used to dispense a chemical Malathion which is like a dry wheat flour dust and will not flow through a hole without some force being applied to it. The chemical applicator apparatus 12 of this invention achieves the desired result to dispense the Malathion chemical onto kernels of grain to prevent insect damage thereto.

The chemical applicator apparatus 12 includes (1) a main housing means 18; (2) a main drive means 20 connected to the main housing means 18; and (3) an actuator and discharge means 22 mounted in the main housing means 18 and driven by the main drive means 20. The main housing means 18 includes an upper container housing 24 integral at the bottom to a lower discharge and support housing 26.

The upper container housing 24 is of a generally square box shape having a front wall 28 integral with parallel side walls 30, 32 and a back wall 34. A motor support plate 36 extends between the front wall 28 and the back wall 34 and parallel with the side walls 30, 32.

It is noted that the upper container housing 24 is open at the top and bottom thereof to permit free flow of material therethrough.

The lower discharge and support housing 26 includes (1) a main housing assembly 38 integral to a connector housing 40; and (2) a support housing assembly 42 connected to the auger conveyor 14 and the connector housing 40.

Figure 2:
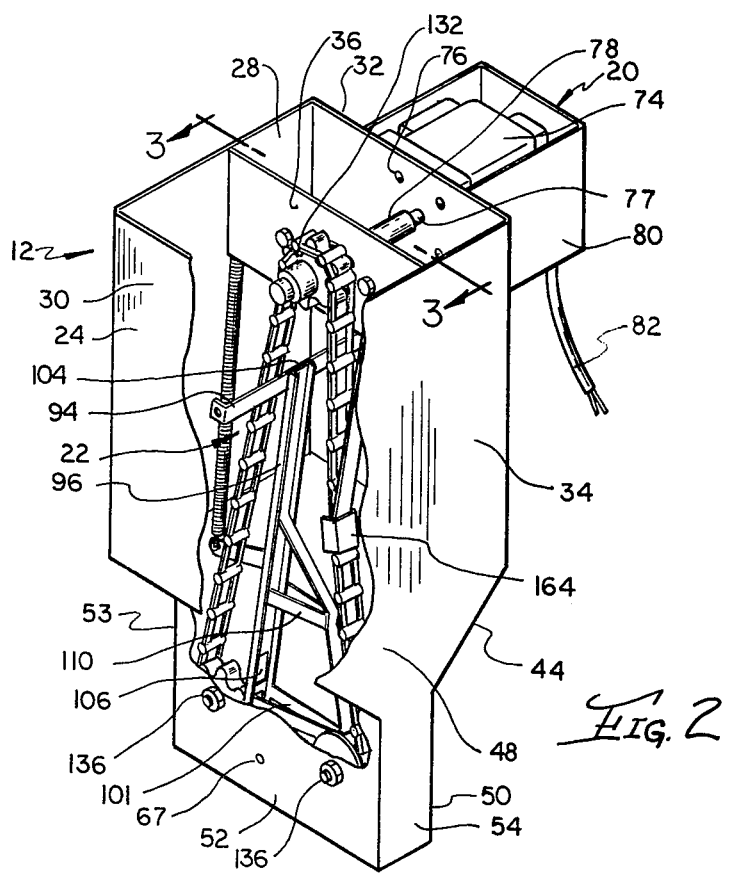
FIG. 2 is a perspective view of the chemical applicator apparatus of this invention with portions broken away for clarity.

As noted in FIGS. 1 and 2, the main housing assembly 38 is integral with the upper container housing 24 and includes (1) inwardly divergent side wall members 43, 44 integral with the side walls 30, 32; (2) a front wall member 46 integral with the side wall members 30, 32 and the front wall 28; and (3) a back wall member 48 integral with the side wall members 30, 32 and the back wall 34.

The connector housing 40 is of an open rectangular box shape having (1) parallel side wall sections 50, 52 integral with the divergent side wall members 43, 44; (2) a front wall section 53 integral with the front wall member 46 and the parallel side wall sections 50, 52; and (3) a back wall section 54 integral with the back wall member 48 and the side wall sections 50, 52.

Inside the connector housing 40 is (1) a support plate 57 mounted between the side wall sections 50 and 52, front wall section 53, and back wall section 54; and (2) a slide gate assembly 55 connected to a bottom surface 59 of the support plate 57. The support plate 57 has a rectangular discharge opening 61 to permit the dispensed substance to pass through.

The slide gate assembly 55 includes a slide gate member 63 supported by a pair of opposed angle iron members 65 secured to respective ones of the side wall sections 50, 52 of the connector housing 40 by rivet member 67 or the like.

The slide gate member 63 is of an L-shape with the longer leg movable 69 as shown by an arrow 71 to control the size of the discharge opening 61 (FIG. 5). A short leg 73 provides a handle action to move the slide gate member 63.

The support housing assembly 42 can vary in size and shape to be mounted on various sizes of auger or even belt type conveyors. The support housing assembly 42 includes a support housing 56 mounted between the connector housing 40 and the auger conveyor 14 being secured thereto by a connector assembly 58.

The support housing 56 can be of various shapes but shown herein with integral side wall portions 60 and 62, a front wall portion 64, and a back wall portion 66. The upper edges of the support housing 56 is secured as by welding or the like to a lower portion of the connector housing 40.

The lower edge of the support housing 56 is secured to the auger conveyor 14 by the connector assembly 58 which consists of (1) a pair of spaced connector ring clamps 68; and (2) an anchor plate 70 on each side of the support housing 56 secured as by spaced nut and bolt members 72 to the support housing 56 and the connector ring clamps 68. An opening (not shown) in the auger conveyor 14 receives the dispensed substance as will be explained.

As best shown in FIG. 2, the main drive means 20 includes (1) a variable speed drive motor member 74 secured as by four (4) bolt members 76 to the motor support plate 36; (2) a main drive shaft 77 driven by the drive motor member 74; (3) a connector drive sleeve 78 secured to the main drive shaft 77 and extended through the motor support plate 36 and carried in a support bearing (not shown) to permit rotation thereof; and (4) a motor housing 80 to surround the drive motor member 74.

The drive motor member 74 is shown as electrically powered through a power supply cord 82.

The motor housing 80 can be secured as by welding or by the bolt members 76 to the upper container housing 24.

The actuator and discharge means 22 forms the heart of the invention and includes (1) an actuator means 84 connected to and mounted within the main housing means 18; (2) a biasing means 86 connected between the main housing means 18 and the actuator means 84; and (3) a chain tension means 88 mounted between the actuator means 84 and the main housing means 18.

As best shown in FIGS. 2 and 3, the actuator means 84 includes an actuator assembly 90 connected to and operated by a sprocket and chain assembly 92. The actuator assembly 90 is constructed of a metal strap type material.

The actuator assembly 90 includes (1) a main support member 94; (2) a plunger support member 96 connected at an upper end to the main support member 94; (3) a support and agitator assembly 98 connected to the plunger support member 96; and (4) a plunger and agitator assembly 101 secured to the support and agitator assembly 98.

The main support member 94 is of angle iron construction and extends between the side walls 30, 32 of the upper container housing 24 and pivotally connected thereto as by a pin member 103 or similar device.

The plunger support member 96 has an upper end secured as by welding to a central portion 104 of the main support member 94. The plunger support member 96 is of a U-shape in transverse cross section and has an opening 106 and, as a whole, helps to agitate the chemical or other substance contained therein.

The support and agitator assembly 98 inclues an inclined support strap 108 and parallel connector straps 110, all connected to the plunger support member 96. The inclined support strap 108 is secured as by welding at a top end to the plunger support member 96 and at a bottom end to the plunger and agitator assembly 101.

A central portion 112 of the inclined support strap 108 is secured to the parallel connector straps 110 which, in turn, are secured to the plunger support member 96.

The plunger and agitator assembly 101 includes a plunger member 114 secured as by welding at one end to a lower portion 116 of the plunger support member 96 and parallel, spaced agitator arms 118 depending downwardly from the plunger member 114 for reasons to be described.

The plunger member 114 includes parallel support arms 120 and 122 integral at an outer end to a compactor wall 126 operable in a manner to be explained.

The entire actuator assembly 90 is pivotal about the main support member 94 as shown in dotted lines in FIG. 3 for reasons to become obvious.

The sprocket and chain assembly 92 includes a sprocket assembly 128 having a chain assembly 130 connected thereto. The sprocket assembly 128 includes (1) a drive sprocket 132 secured to the connector drive sleeve 78; (2) an idler pulley 134 mounted on a nut and bolt member 136 between the side wall sections 50, 52 of the connector housing 40; and (3) a discharge sprocket 138 also mounted on a nut and bolt member 136 between the side wall sections 50, 52 of the connector housing.

The above sprockets are substantially identical, having six (6) teeth member 140 to engage the chain assembly 130. The idler pulley 134 has a space therebetween (FIG. 4) to receive the plunger member 114 for compacting the substance therein as will be described.

The chain assembly 130 is of a conventional farm type drag chain having interconnected chain link members 142.

Each chain link member 142 includes parallel side walls 144 interconnected at one end with circular support ends 146 and at the opposite ends connected to pivotal end sections 148.

The chain assembly 130 is trained about the drive sprocket 132, the idler pulley 134, and the discharge sprocket 138, as shown in FIG. 3.

As best shown in FIG. 3, the biasing means 86 includes support arm member 150 secured at one end to the plunger support member 96 and at an outer end to a spring assembly 152.

The spring assembly 152 includes a tension type spring member 154 connected by a hook portion 156 to the support arm member 150 and to a nut and bolt member 158 at an upper end portion 160 to a front wall 28 of the upper container housing 24.

The chain tension means 88 includes a resilient strap member 162 secured at an upper end to a back wall 34 of the upper container housing 24 and at a lower end to a chain receiving section 164.

The chain receiving section 164 is of a U-shape in transverse cross section and surrounds the chain assembly 130 and, due to the resilient strap member 162, biases the chain assembly 130 inwardly as indicated by an arrow 168.

USE AND OPERATION OF THE INVENTION

As shown in FIG. 1, the chemical applicator apparatus 12 of this invention is connected by the spaced connector ring clamps 68 to the outer surface of the auger conveyor 14. The auger conveyor 14 has an opening (not shown) to receive a predetermined amount of chemical or other substance such as Malathion therein for dust coating the kernels of grain being conveyed upwardly into the storage bin 16 to prevent insect damage.

The power to drive the auger conveyor 14 is coordinated with the power supplied to the drive motor member 74 through the power supply cord 82. The drive motor member 74 is of variable speed to control operation of the actuator and discharge means 22.

The operation is best shown in FIG. 3 wherein the acturator and discharge means 22 is driven as shown by the arrows 170 in a counterclockwise direction. The drive sprocket 132 operates to convey and move the chain assembly 130. Any slack in the chain assembly 130 is automatically taken up by the chain tension means 88 by applying a force against the chain assembly 130 as shown by the arrow 168.

The actuator assembly 90 is biased toward the noncompacting position as shown in dotted lines in FIG. 3 to place the lower end of the plunger support member 96 against one of the teeth members 140 on the discharge sprocket 138.

Further rotation of the discharge sprocket 138 moves the plunger and agitator assembly 101 to the left as shown by an arrow 172 in FIG. 3. Also, refer to FIG. 4, wherein the plunger member 114 is shown within the idler pulley 134 and the compactor wall 126 to compress the chemical or other substance therein into capsules 178. The shape of the capsules 178 is created on the top surface by movement through the idler pulley 134 and the shape of the bottom surface is created by friction against a top surface 180 of the support plate 55.

At the discharge sprocket 138, each capsule 178 is positively ejected by one of the teeth members 140 through the discharge opening 61 as shown in FIG. 5. Also, the slide gate member 63 can be adjusted to regulate the size of the discharge opening 61 and thus a controlled amount of chemical or other substance is ejected to cover the kernels of grain.

Also, the agitator arms 118 act to move the chemical or other substance therein to and in downward flow thereof. In fact, the biasing means 86 moves the entire actuator assembly 90 to the right as shown in FIG. 3 with a sudden or snap movement to place the plunger support member 96 against one of the teeth members 140 on the discharge sprocket 138. This provides a shaking movement necessary to assure the downward movement of the flour-like chemical or other substance contained in the main housing means 18.

The chemical applicator apparatus of this invention is readily adapted for use with various sizes of auger or even belt conveyors. The rate of chemical or other substance discharge from the chemical applicator apparatus can be easily regulated by coordination of auger speed with the main drive means.

The chemical applicator apparatus of this invention is sturdy in construction, easy to maintain, simple to operate, and reliable in operation.

While the invention has been described in conjunction with preferred specific embodiments thereof, it will be understood that this description is intended to illustrate and not to limit the scope of the invention, which is defined by the following claims.

I claim:

1. A chemical applicator apparatus adapted to dispense a controlled amount of substance into a conveyor structure; comprising:
   (a) a main housing means to hold the substance therein and connected to the conveyor structure;
   (b) a main drive means connected to said main housing means;
   (c) an actuator and discharge means mounted in said main housing means and connected to said main drive means for operation thereof; and
   (d) said actuator and discharge means moves to compress the substance into a capsule, move the capsule to a discharge opening, and forcefully ejects the capsule through said discharge opening.

2. A chemical applicator apparatus as described in claim 1, wherein:
   (a) said main drive means includes a drive motor member connected to a main drive shaft to rotate same; and
   (b) said main drive shaft connected to said actuator and discharge means to achieve operation thereof.

3. A chemical applicator apparatus as described in claim 1, wherein:
   (a) said actuator and discharge means includes an actuator assembly pivotally connected to said main housing means, and a sprocket and chain assembly connected to said main drive means and said main housing means;
   (b) said sprocket and chain assembly having a chain assembly trained about a drive sprocket, an idler pulley, and a discharge pulley; and
   (c) said drive sprocket rotates to move said chain assembly to agitate the substance in said main housing means to move same downwardly toward said discharge opening.

4. A chemical applicator apparatus as described in claim 3, wherein:
   (a) said chain assembly of a farm drag chain type having a plurality of chain link members, each having parallel side walls connected to a circular support and a pivotal end section to form a rectangular space therebetween; and
   (b) the capsules of substance to be discharged are formed in said rectangular spaces for subsequent discharge through said discharge opening.

5. A chemical applicator apparatus as described in claim 3, wherein:
   (a) said actuator assembly includes a support member pivotally connected to opposed side walls of said main housing means, a plunger support member secured to said support member, and a plunger and agitator assembly connected to a lower end of said plunger support member; and (b) said plunger and agitator assembly engages said discharge sprocket for reciprocating movement and compresses the capsules of substance in said chain link members.

6. A chemical applicator apparatus as described in claim 5, wherein:
(a) said main housing means includes a connector housing having a support plate and a slide gate assembly connected to said support plate; and
(b) said support plate having said discharge opening therein and said slide gate assembly is movable to control the size of said discharge opening.

7. A chemical applicator apparatus as described in claim 5, wherein:
(a) said actuator assembly further includes a support and agitator assembly connected at an upper end to said plunger support member and at a lower end to said plunger and agitator assembly to further agitate the substance in said main housing means for continued downward movement thereof.

8. A chemical applicator apparatus as described in claim 5, wherein:
(a) said plunger and agitator assembly includes a pair of spaced downwardly depending agitator arms to move and agitate the substance therein.

9. A chemical applicator apparatus as described in claim 1, including:
(a) a biasing means connected to said main housing means and actuator and discharge means to urge same to a retracted position and resist movement of the actuator and discharge means in the opposite direction to compress the capsules.

10. A chemical applicator apparatus as described in claim 3, including:
(a) a chain tension means connected to said main housing means and engageable with said chain assembly to provide pressure thereagainst and take up any slack in said chain assembly.

* * * * *